US008667401B1

(12) United States Patent
Lozben

(10) Patent No.: US 8,667,401 B1
(45) Date of Patent: Mar. 4, 2014

(54) SYSTEM AND METHOD FOR ARCHIVING COLLABORATIVE ELECTRONIC MEETINGS

(75) Inventor: Slavik Lozben, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 2285 days.

(21) Appl. No.: 10/854,762

(22) Filed: May 26, 2004

(51) Int. Cl.
*G06F 3/048* (2013.01)

(52) U.S. Cl.
USPC ........... 715/753; 715/751; 715/719; 715/723; 715/756

(58) Field of Classification Search
USPC ......... 715/719, 725, 723, 716, 751, 753, 764, 715/756, 758
See application file for complete search history.

(56) References Cited

U.S. PATENT DOCUMENTS

| | | | |
|---|---|---|---|
| 5,619,555 A | | 4/1997 | Fenton et al. |
| 5,832,065 A | | 11/1998 | Bannister et al. |
| 5,841,977 A | * | 11/1998 | Ishizaki et al. ............... 709/204 |
| 6,014,135 A | * | 1/2000 | Fernandes ..................... 715/744 |
| 6,119,147 A | * | 9/2000 | Toomey et al. ............... 709/204 |
| 6,137,485 A | * | 10/2000 | Kawai et al. .................. 715/719 |
| 6,195,683 B1 | | 2/2001 | Palmer et al. |
| 6,349,327 B1 | * | 2/2002 | Tang et al. .................... 709/205 |
| 6,370,533 B1 | * | 4/2002 | Sato et al. .............................. 1/1 |
| 6,392,760 B1 | | 5/2002 | Ahuja et al. |
| 6,421,706 B1 | | 7/2002 | McNeill et al. |
| 6,608,636 B1 | * | 8/2003 | Roseman ...................... 715/753 |
| 6,760,749 B1 | * | 7/2004 | Dunlap et al. ................ 709/204 |
| 6,934,370 B1 | | 8/2005 | Leban et al. |
| 7,213,051 B2 | * | 5/2007 | Zhu et al. ...................... 709/205 |
| 2002/0109712 A1 | * | 8/2002 | Yacovone et al. ............. 345/732 |
| 2002/0149671 A1 | | 10/2002 | Duran et al. |
| 2002/0191071 A1 | * | 12/2002 | Rui et al. .................... 348/14.03 |
| 2003/0052910 A1 | * | 3/2003 | Shiiyama ...................... 345/719 |
| 2003/0105820 A1 | * | 6/2003 | Haims et al. .................. 709/205 |
| 2003/0169330 A1 | * | 9/2003 | Ben-Shachar et al. ..... 348/14.09 |
| 2003/0182428 A1 | * | 9/2003 | Li et al. ......................... 709/227 |
| 2003/0220973 A1 | * | 11/2003 | Zhu et al. ...................... 709/205 |
| 2004/0008635 A1 | * | 1/2004 | Nelson et al. ................. 370/260 |

(Continued)

OTHER PUBLICATIONS

U.S. Appl. No. 11/110,651, filed Apr. 20, 2005.

(Continued)

*Primary Examiner* — Daeho Song
(74) *Attorney, Agent, or Firm* — Kilpatrick Townsend & Stockton LLP

(57) ABSTRACT

An electronic meeting application is disclosed which allows electronic meetings to be recorded and archived. The electronic meeting is driven by a plurality of input sources synchronized according to each one's order of play in the meeting. This synchronization is maintained by a main meeting timeline. The disclosed electronic meeting application records each of the input sources into separately accessible data files. The data files may be converted into metadata files that can used for searching purposes. Metadata description files are also generated that describe the appearance of each of the objects displaying the information from the input sources. On replay of the recorded meeting, the meeting application uses the metadata files to re-render the meeting interface and display the recordings of the selected input sources. Therefore, a user may select the specific content from the meeting to replay.

30 Claims, 7 Drawing Sheets

(56) References Cited

U.S. PATENT DOCUMENTS

| | | |
|---|---|---|
| 2004/0100501 A1* | 5/2004 | Dornback .................... 345/769 |
| 2004/0263636 A1 | 12/2004 | Cutler et al. |
| 2005/0044499 A1* | 2/2005 | Allen et al. .................. 715/704 |
| 2005/0102632 A1* | 5/2005 | Klinger et al. ............... 715/789 |
| 2005/0114527 A1* | 5/2005 | Hankey et al. ............... 709/228 |
| 2005/0213739 A1 | 9/2005 | Rodman et al. |
| 2005/0262201 A1 | 11/2005 | Rudolph et al. |
| 2007/0022159 A1* | 1/2007 | Zhu et al. .................... 709/204 |

OTHER PUBLICATIONS

Office Action dated Jul. 24, 2008 in related U.S. Appl. No. 11/110,651.

Office Action dated Jan. 12, 2009 in related U.S. Appl. No. 11/110,651.

Office Action dated Jun. 15, 2009 in related U.S. Appl. No. 11/110,651.

Office Action dated Nov. 24, 2009 in related U.S. Appl. No. 11/110,651.

* cited by examiner

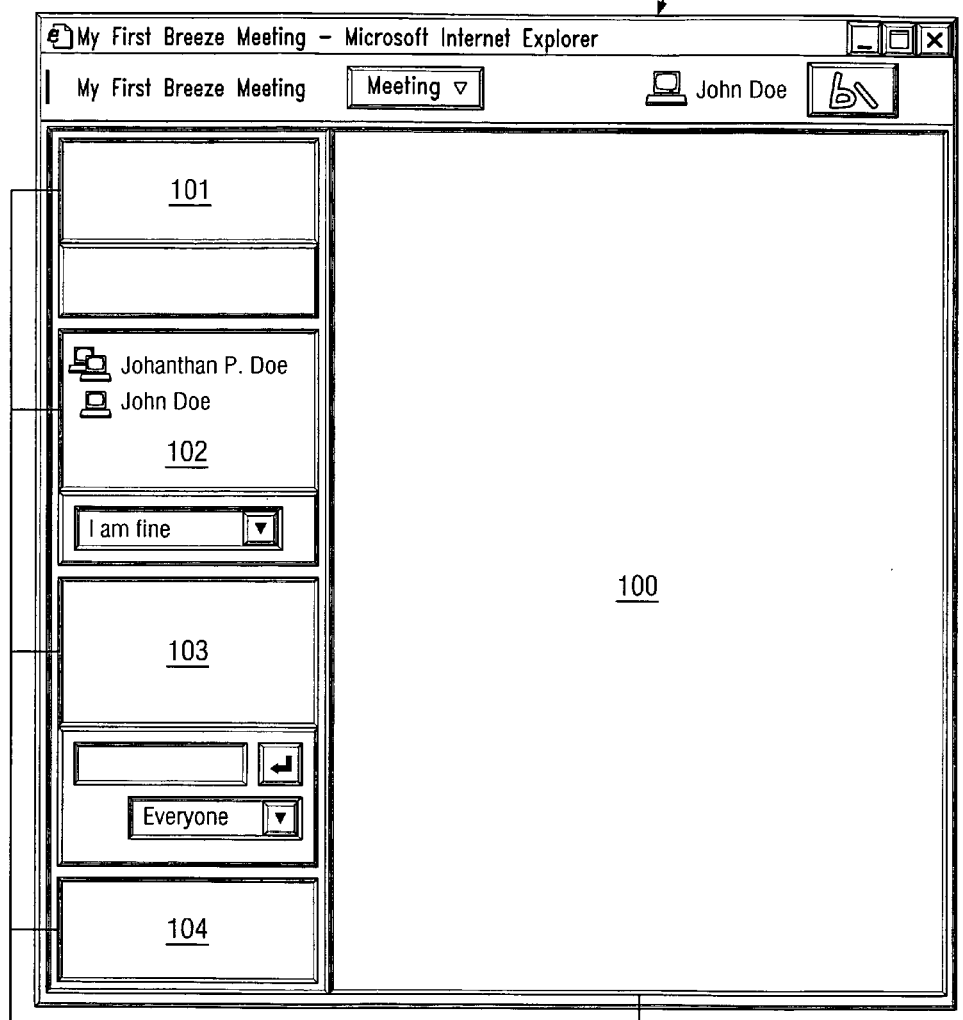
FIG. 3
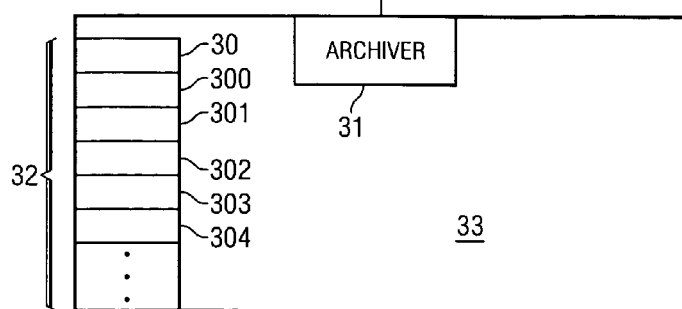

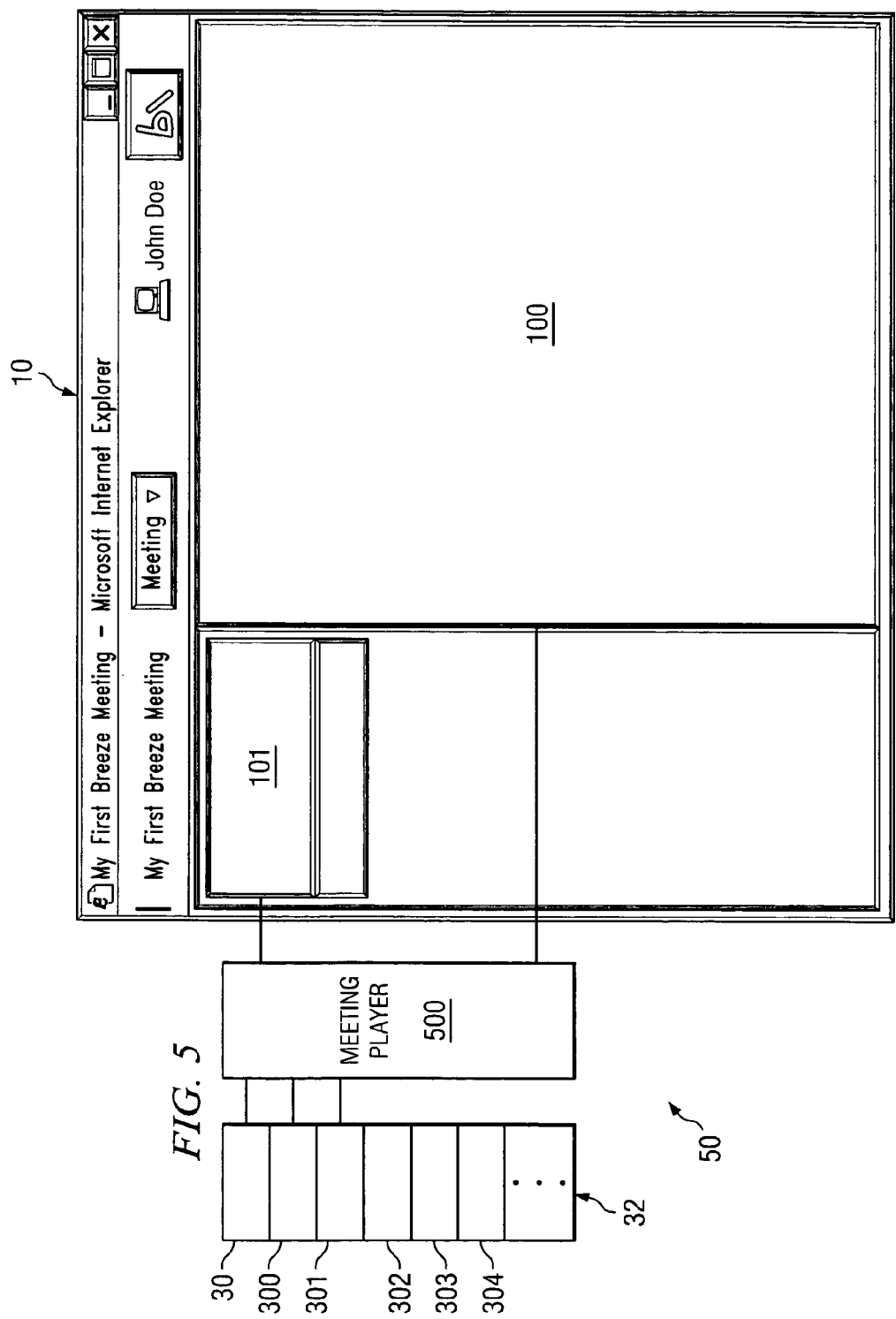

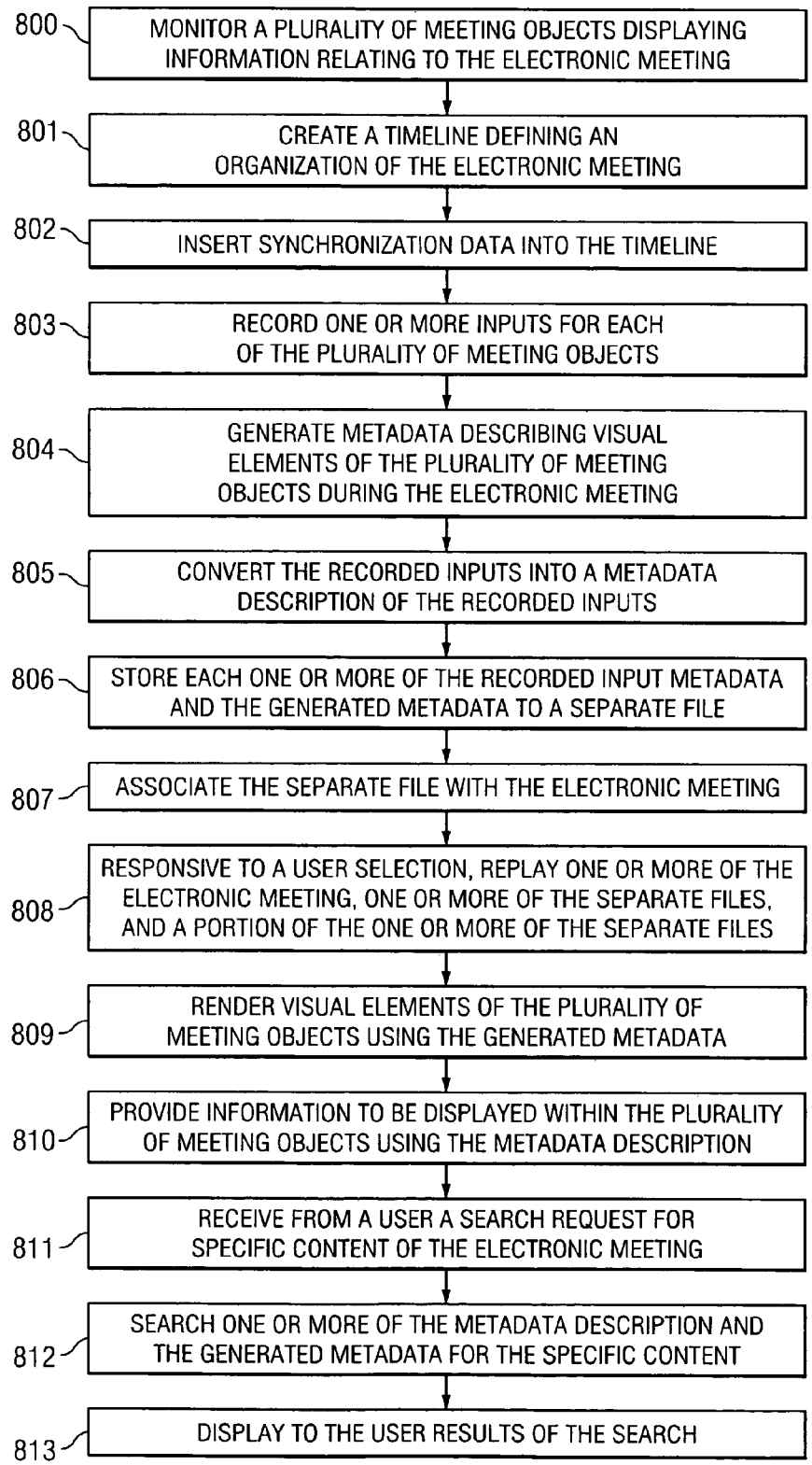

SYSTEM AND METHOD FOR ARCHIVING COLLABORATIVE ELECTRONIC MEETINGS

TECHNICAL FIELD

The present invention relates, in general, to collaborative electronic meetings, and, more specifically, to archiving of collaborative electronic meetings.

BACKGROUND OF THE INVENTION

The first Internet was a communications system funded and built by researchers for military use. This Internet, originally known as ARPANET, was embraced by the research and academic world as a mechanism for scientists to share and collaborate with other scientists. This collaborative network quickly evolved into the information superhighway of commerce and communication. The Internet explosion was due, in part, by the development of the World Wide Web (WWW) and Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Videoconferencing, which has generally never been able to completely supplant teleconferencing as a viable means for communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like. While the WEBEX™ services are generally initiated over the Internet, once a collaborative meeting or session is established, the communications are transferred to a proprietary network.

Current electronic meeting space applications, including WEBEX™, allow recording of the actual meeting. Thus, audio, slide presentations, shared desktop sessions, chat, and other such information that takes place during the electronic meeting are recorded and may be viewed after the meeting is over. Many such online meeting software applications convert various file formats, such as MACROMEDIA, INC.'s MACROMEDIA FLASH™, MICROSOFT CORPORATION's POWERPOINT™, or the like into a single common format such as Small Web File (SWF) format, which is the native format for MACROMEDIA FLASH™, or WEBEX COMMUNICATION INC.'s UNIVERSAL COMMUNICATION FORMAT™ (UCF), thereby allowing the presentation and integration of different file format types. These applications typically record the playback of the meeting in this single, common format, much like a video camera would record some kind of visual presentation (i.e., the video camera would record a scene comprised of many different items into one movie).

The meeting recording may be edited in such a manner that only certain sections of the meeting are replayed or condensed into a separate file for separate viewing. This ability would allow a meeting or training session covering 10 different consecutive topics to be divided into 10 different recordings, which would allow a more targeted replay of specific content. However, while recorded consecutive sessions may be segmented, all of the data that was presented during that time segment will be displayed to the recording viewers. Therefore, potentially unwanted information within the segment, such as chat messages that occurred during that time segment, would be preserved in the archived presentation. The meeting host or presenter would need to deactivate the unwanted information stream prior to any recording in order to prevent that information from being recorded in the first place.

BRIEF SUMMARY OF THE INVENTION

The present invention is directed to a system and method for recording and archiving electronic meetings, collaborations, or presentations. The electronic meeting interface provides several display pods or meeting objects that may support a number of different media for a number of different purposes. For example, one meeting object may show presentation slides, or may share a screen with another participant, or may show a list of meeting participants, or the like.

In recording an electronic meeting, an archiving function monitors each meeting object, noting the object's creation or deletion times, its position on the meeting interface and also the content being displayed on the object's display canvas. All of this information is stored in a file related to that particular meeting object but also associated in general with the electronic meeting. The multiple individual meeting objects are contained by a main timeline, which also monitors the meeting and notes the creation, deletion, and movement of each of the objects in relation to the progress of the entire meeting.

As each of the input sources of the meeting objects are recorded into its own independently accessible file, an index utility converts the recorded files into metadata files, such as files represented in Extensible Markup Language (XML), or the like. These metadata files describe each meeting object as it appeared in the meeting, such that when the object or some part thereof is selected to be replayed, the electronic meeting application uses the metadata to create and re-render the individual meeting objects or pods and, thereafter, populate the object's display canvas with the recorded content. Because the metadata files provide description of each of the meeting objects, various search tools may be used to search the metadata for desired content. The recording process does not actually record the physical appearance of the pods or meeting objects, instead simply recording a description of the object or pod.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is a block diagram illustrating an electronic meeting application configured according to one embodiment of the present invention interacting with its interface;

FIG. 5 is a block diagram illustrating an electronic meeting application configured according to one embodiment of the present invention providing a replay of selected portions of a previous meeting;

FIG. 8 is a flowchart illustrating example steps performed in implementing an additional embodiment of the present invention.

DETAILED DESCRIPTION OF THE INVENTION

Figure 1:
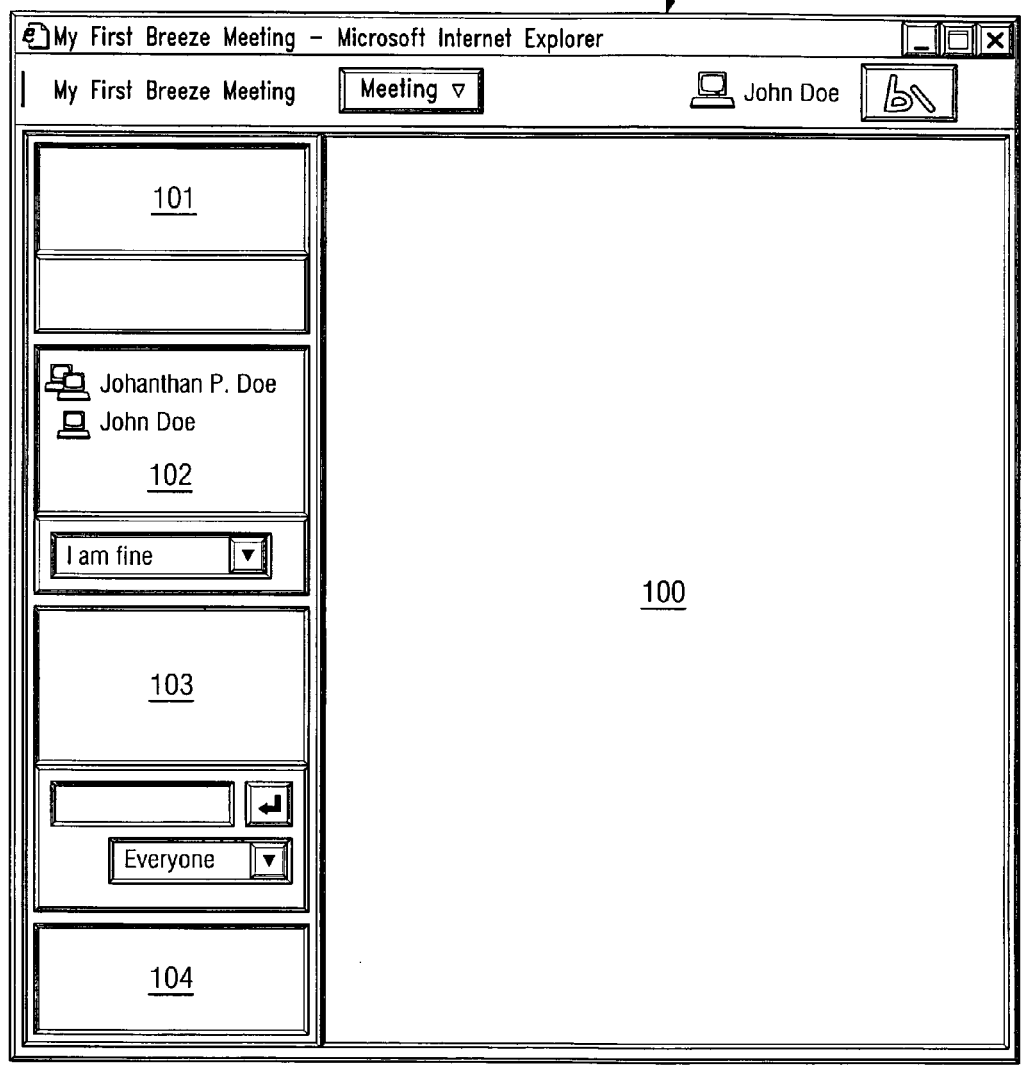
FIG. 1 is a diagram illustrating a typical interface to an electronic meeting space.

FIG. 1 is a diagram illustrating a typical interface to an electronic meeting space. Interface 10 typically comprises a number of different objects or containers that display a certain category of information to the meeting participants. Presentation object 100 may display slides from a presentation software, such as MACROMEDIA FLASH™, POWERPOINTT™, or the like. Podium 101 displays the audio and video from a camera, which may provide a speaking position for a meeting presenter. Attendee box 102 may display a list of meeting participants and presenters in current attendance of the electronic meeting. Chat box 103 may provide chatting capabilities to each of the meeting attendees for exchanging text notes or text discussions. Note box 104 may allow each individual attendee to enter notes or comments with regard to the presentation or meeting. Note box 104 may be visible only to the particular user or may be accessible by all participants or attendees.

While the conglomeration of the various meeting objects are presented within the single, interface 10, each of the different meeting objects is driven by a separate stream of data or information. For example, presentation object 100 may be provided with a stream of data from a MACROMEDIA FLASH™ presentation file, while the audio and video streams for podium 101 are provided from a camera and microphone in a different location than the MACROMEDIA FLASH™ presentation file. As previously indicated, in the current versions of electronic meeting applications, when a meeting is recorded, the visual presentation of the different meeting objects are recorded into a single meeting presentation file. A recorded presentation file may be edited to extract any desired time segments of the file reflecting certain portions of the recorded meeting, but within each selected time segment, each of the individual objects will be displayed as a part of that single file.

Figure 2:
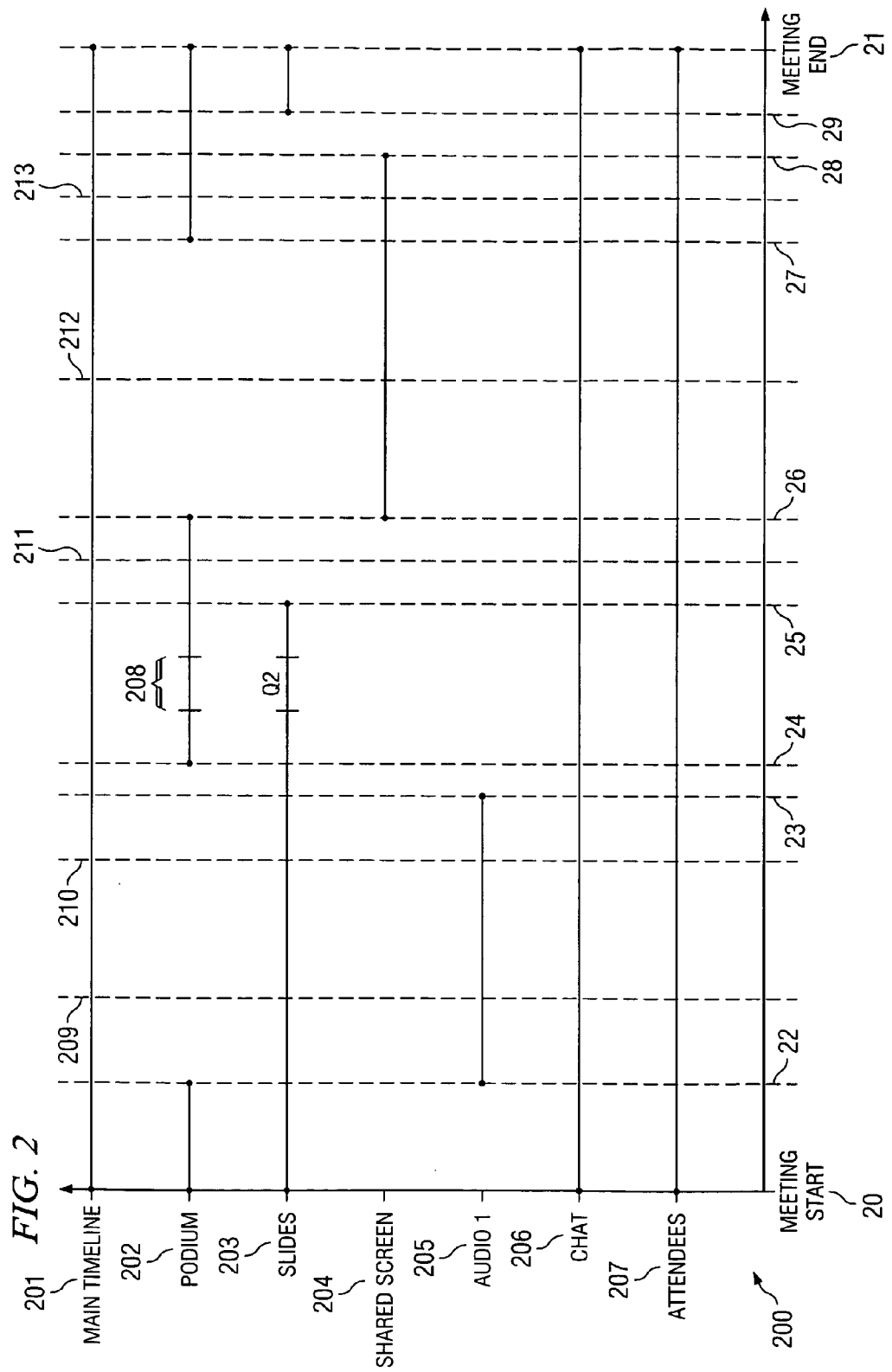
FIG. 2 is a relative timeline of multiple data streams in an electronic presentation application configured according to one embodiment of the present invention.

FIG. 2 is a relative timeline of multiple data streams in an electronic presentation application configured according to one embodiment of the present invention. Timeline 200 relates the timeline of each individual meeting object to main timeline 201. Main timeline 201 is created at meeting start 20 and ends at meeting end 21. It defines the duration of any particular electronic meeting. Podium timeline 202 shows the activity of the podium object. As illustrated, a speaker begins a podium presentation at meeting start 20 and then stops at time point 22. The podium is then active again between time points 24 and 26, and then again between time points 27 and meeting end 21. Slides timeline 203 is shown active between meeting start 20 and time point 25 and then again between time point 29 and meeting end 21. Shared screen timeline 204 is shown active only between time points 26 and 28. Audio1 timeline 205, which may represent a recorded audio file that plays over selected slides or the like, is shown active only between time points 22 and 23. Chat timeline 206 and Attendees timeline 207, because of the nature of a chat communication and a list of current attendees, are shown active during the entire meeting.

The relative timeline depicted in FIG. 2 may represent an online meeting in which the presenter makes a few opening remarks while starting a slide presentation. At time point 22, a pre-recorded audio file may be played to explain portions of the slide presentation. At time point 24, after the audio presentation has stopped, the speaker may begin discussing the last portions of the slide show, which, for purposes of the example, may be the financial results of the $2^{nd}$ quarter for a particular company. The speaker/presenter may continue speaking after the slide show stops and then may share his or her screen beginning at time point 26. The speaker may make some final comments beginning at time point 27 to finish the screen sharing and the restarting a closing slide presentation at time point 29. The attendees are shown through out the duration of the meeting as well as the chat capabilities. Therefore, chat timeline 206 and attendees timeline 207 are shown open over the entire meeting.

In the embodiment shown in FIG. 2, synchronization data may be added to main timeline 201, which indicates the presentation order of the meeting objects. Main timeline 201 keeps track of each meeting object being displayed during the meeting. Information on when the object was created, deleted, moved, activated, deactivated, and the like is monitored and placed on main timeline 201. The individual timelines for the various meeting objects include timing data with respect to their own activity. For example, audio1 timeline 205, which represent a pre-recorded audio file, would note that it played for a time between timepoints 22 and 23. However, main timeline 201 would note that an audio player meeting object was created at an offset time of meeting start timepoint 20 plus timepoint 22 and played for a time equal to the time between timepoints 22 and 23. Therefore, audio1 timeline 205 started at meeting start timepoint 20 plus timepoint 22 and stopped at timepoint 23. Main timeline 201 would also note that the audio player meeting object was then deleted at timepoint 23 (if, in fact, the object was deleted when the pre-recorded audio file stopped).

In another embodiment of the present invention, synch points may be systematically assigned along main timeline 201 with each meeting event taking an offset time from those synch points. Synch points 209-213 are illustrated in FIG. 2 as regular points along the time line that indicate the timing and order of the combined presentation. This information may be saved associated with main timeline 201 with further associations to the individual timelines, timelines 201-207. Thus, if a user attempts to replay only slides timeline 203 and audio1 timeline 205 over timepoints 22 and 23, the two timelines would use main timeline 201 to obtain the synchronization between slides timeline 204 and audio1 timeline 205.

It should be noted that in additional or alternative embodiments of the present invention, such synchronization data may be placed within the recordings of each individual meeting object. Thus, if the same replay of slides timeline 203 and audio1 timeline 205 is made, synch points within the two timelines are matched up in order to synchronize the two timelines.

FIG. 3 is a block diagram illustrating electronic meeting application 33 configured according to one embodiment of the present invention interacting with interface 10. As illustrated in FIG. 1, interface 10 includes a number of different meeting objects or pods in objects 100-104. Electronic meeting application 33, which produces interface 10 and is run on some kind of computer or personal computer, includes archiver 31 for managing the recording of online meetings or collaborations utilizing electronic meeting application 33. Archiver 31 monitors the creation, deletion, and movement of each of objects 100-104 and direct electronic meeting application 33 to save or record the data being displayed in any of objects 100-104 and also directs information concerning the creation, deletion, and movement of objects 100-104 to be saved along with the underlying data.

Archiver 31 monitors each of the pods within interface 10. For example, archiver 31 may monitor and detect that chat object 103 is created at the time when the collaboration or meeting commences. As meeting participants select chat object 103 and type in chat messages to any one or a number of other meeting participants, archiver 31 stores the information related to chat object 103 in memory 32. Specifically, archiver 31 directs the text of the chat messages to be stored along with the time that chat object 103 was initialized, any movement that the user applies to object 103 is also recorded. For example, if the user were to move chat object 103 to a different part of interface 10, archiver 31 would direct electronic meeting application 33 to record the visual aspects of the nature, location, movement, and appearance of object 103 as metadata. Thus, archiver 31 stores the meta information related to object 103 in chat slot 303 of memory 32. Archiver 31 similarly stores the meta information related to presentation object 100 in presentation slot 300, the video from podium 101 into podium slot 301, the meta information from attendee object 102 into attendee slot 301, and the meta information from note object 104 into note slot 304. Archiver 31 will also store the main timeline for the meeting in main timeline slot 30. Therefore, instead of recording simply the underlying information or data that feeds each of the meeting pods, the described embodiment of the present invention records metadata about these objects and the organization of the meeting. Some objects will also have data files as well as metadata files associated with it. For example, podium 101 may have its video data stored in podium slot 301 and metadata associated with podium 101, such as when it was created and deleted, where it was rendered, and the like, in a separate metadata file. The metadata files would typically be much smaller in size than a simple recording of the entire screen of an electronic meeting application.

During playback, electronic meeting application 33 uses the metadata from memory 32 to reconstruct not only the underlying information being displayed to the user, but also the appearance of interface 10. The embodiment of electronic meeting application 33 is such that each pod or meeting object is capable of rendering itself based on the metadata contained in memory 32. Once rendered, each pod fills its presentation object or interface with the actual replay of the meeting information.

Figure 4A:
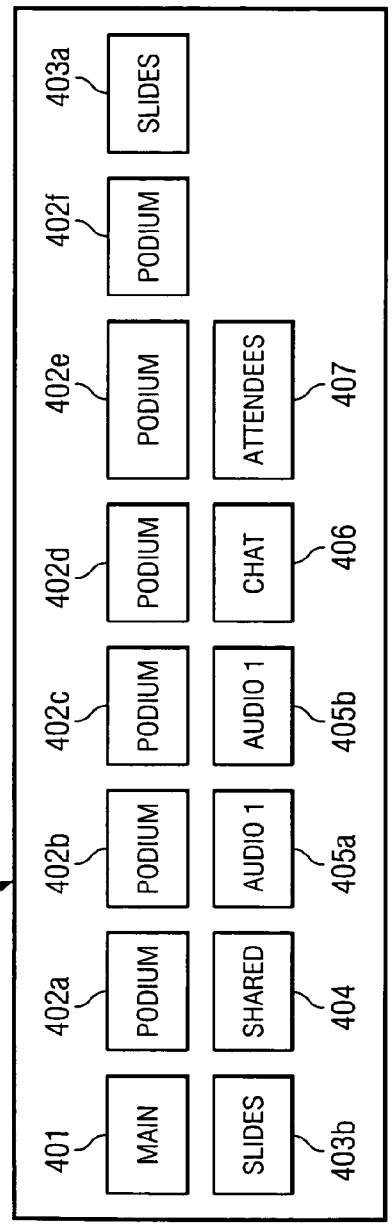
FIG. 4A is a block diagram illustrating storage used in conjunction with an electronic meeting application configured according to an embodiment of the present invention.

FIG. 4A is a block diagram illustrating storage 400 used in conjunction with an electronic meeting application configured according to another embodiment of the present invention. As the meeting depicted in FIG. 2 is recorded, separate storage blocks store the data underlying the different presentation objects. In the embodiment depicted in FIG. 4A, each instance of a meeting object or pod is considered a separate object. Thus, while podium timeline 202 (FIG. 2) illustrates a single timeline in which the podium is active between meeting start 20 and time point 22 (FIG. 2), is active again between time point 24 and 26 (FIG. 2), and active again between time point 27 and meeting end 21 (FIG. 2), the embodiment shown in FIG. 4A considers this three separate instances of the podium meeting object. Each separate instance will have its own separate timeline that will be relative to the main timeline. Furthermore, the data and metadata associated with each meeting object instance will be stored in a separate file or storage block associated with the particular meeting object instance.

Data and metadata for the recorded meeting is, therefore, stored in main block 401, podium blocks 402a-f, slides blocks 403a-b, shared block 404, audio1 blocks 405a-b, chat block 406, and attendees block 407. Each of the storage blocks is separate from the others, but are related or associated with each other and the particular meeting object or pod from which the recorded information comes. Users who wish to replay selected portions of the meeting may select those portions by selecting and potentially editing the data in storage blocks 402a-407. Replay of the selected sections may be synchronized using the synchronization information stored in main timeline 401. Therefore, should a person not wish to view the chat information in chat block 406, he or she would simply leave chat block 406 alone.

In recording the data and metadata from a recorded electronic meeting, some meeting objects, which may have audio or video associated therewith, may have multiple associated storage blocks. For example, with reference to the three instances of a podium meeting object shown in FIG. 2 and referred to above, podium block 402a may contain the metadata associated with the first instance of the podium object between meeting start 20 and timepoint 22. Podium 402b may then contain the video and audio data associated with this first instance of the podium object. Similarly, the data and metadata associated with the second instance of the podium object may be recorded into podium blocks 402c-d, respectively, and the data and metadata associated with the third instance of the podium object may be recorded into podium blocks 402e-f, respectively.

Figure 4B:
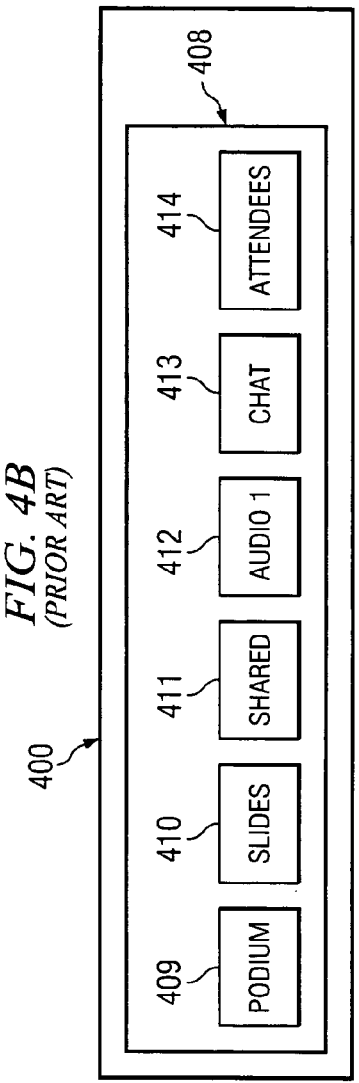
FIG. 4B is a block diagram illustrating storage when it is used in conjunction with a previous electronic meeting application.

FIG. 4B is a block diagram illustrating storage 400 when it is used in conjunction with a previous electronic meeting application. Instead of recording and storing the meeting information into separate and independent storage blocks, as shown in FIG. 4A illustrating an embodiment of the present invention, the meeting information comprising podium data 409, slides data 410, shared data 411, audio1 data 412, chat data 413, and attendees data 414 is stored into a single block, meeting storage block 408. Where users may edit meeting data in a linear fashion, all of the information contained across the meeting will be within the edited portion. For example, referring to FIG. 2, if a user edited the meeting data from meeting storage block 408 (FIG. 4B) to play only from timepoints 27 and 28, all of the data from that time frame in podium timeline 202, slides timeline 203, chat timeline 206, and attendees timeline 207 will be included in the edited portion whether or not the user wishes to include all of that information. This is because the information is all saved into the single block, meeting storage block 408 (FIG. 4B).

FIG. 5 is a block diagram illustrating electronic meeting application 50 configured according to one embodiment of the present invention providing a replay of selected portions of a previous meeting. The metadata and underlying information from the previous meeting to be replayed is stored in memory 32. A user, who desires to replay the slide presentation, stored in slides slot 300, and the speaker's comments, stored as a video file in podium slot 301, directs electronic meeting application 50 to replay only those two portions of the previous meeting.

In creating the replay, electronic meeting application 50 directs meeting player 500 to retrieve the data in slides slot 300 and podium slot 301 for presentation on interface 10. According to the embodiment shown, meeting object 100 and 101 render themselves on interface 10 and begin populating their respective display canvases with the replay data from the previous meeting. Slides will begin to be shown on meeting object 100, while the speaker's video and voice will be played and viewed from meeting object 101 according to the main timeline that had been stored in main timeline slot 30. Meeting player 500 uses the metadata from slides slot 300 and video recording from podium slot 301 along with the synchronization data from the main timeline to replay this specific portion of the previous meeting.

The ability to save electronic meetings as mostly metadata not only results in a substantial file size savings but also allows users to employ search applications to search for specific topics, words, phrases, and the like in various archived meetings or presentations. It should be noted that in additional embodiments of the present invention, text-to-speech technology may be used to convert spoken words, either in a pre-recorded audio piece or a live discussion, into text that may be represented in metadata and, thereby, included in the searching ability. Therefore, a search for a particular topic may also return matches that were included only in an audio file or meeting conversation.

In one embodiment of the present invention, the electronic meeting may be recorded into a multimedia file format, such as MACROMEDIA, INC.'s MACROMEDIA FLASH VIDEO™ (FLV) or the like, which may store audio, video, and data in the same file format. When recorded in such a FLV file, each meeting object or pod may have one or more FLV files associated with it. Over the course of the meeting object's life in the electronic meeting, the metadata related to that pod will be recorded onto the FLV file. Moreover, if a meeting object includes video and audio, a FLV file will hold the video and audio which will not only also be associated with the same pod as the metadata FLV, but will be completely separate from the metadata FLV. In alternative embodiments of the present invention, the audio and video may be recorded into separate FLV files, or whether or not the audio and video is recorded in the same or separate files may be left as an option for the user to select.

The nature of the FLV format stores its data in a highly structured manner, whether that data is plain data, audio, or video data. Because of its structured nature, an indexing utility may then convert the plain data FLV file recordings of the various meeting objects or pods into an Extensible Markup Language (XML) representation of the FLV files; leaving the audio and video FLV files alone. With the XML document index of the meeting, many standard indexing and searching applications may be used to search an electronic meeting archive.

It should be noted that in additional and/or alternative embodiments of the present invention, the audio and video FLV files may, in fact, be converted to an XML description file. The description of the embodiment that leaves the audio and video FLV files alone is not intended to limit the various embodiments of the present invention to only converting the data FLV files into corresponding XML representations.

The program or code segments making up the electronic meeting application configured according to the present invention can be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
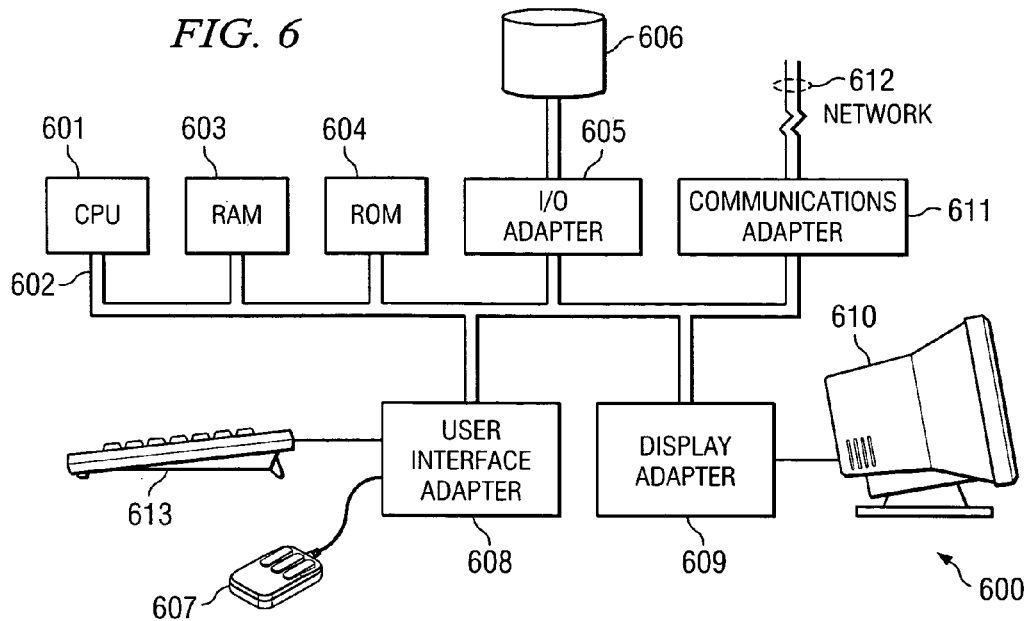
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to printer 614, which would allow the system to print paper copies of information such as documents, photographs, articles, etcetera. Note that the printer may be a printer (e.g. dot matrix, laser, etcetera.), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, etcetera to the computer system 600. The display card 609 is driven by CPU 601 to control the display on display device 610.

Figure 7:
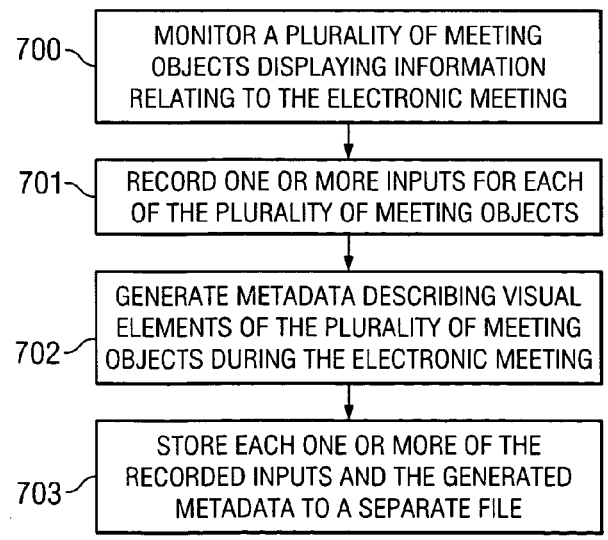
FIG. 7 is a flowchart illustrating example steps performed in implementing one embodiment of the present invention.

FIG. 7 is a flowchart illustrating example steps performed in implementing one embodiment of the present invention. In step 700, a plurality of meeting objects displaying information relating to the electronic meeting are monitored. One or more inputs for each of the plurality of meeting objects is recorded, in step 701. In step 702, metadata is generated that describes visual elements, such as the type, location, style, or movement, of the plurality of meeting objects during the electronic meeting. In step 703, each one or more of the recorded inputs and the generated metadata is stored to a separate file.

FIG. 8 is a flowchart illustrating example steps performed in implementing an additional embodiment of the present invention. In step 800, a plurality of meeting objects displaying information relating to the electronic meeting are monitored. A timeline is created, in step 801, defining an organization of the electronic meeting. Synchronization data is inserted, in step 802, into the timeline. In step 803, one or more inputs is recorded for each of the plurality of meeting objects. Metadata is generated, in step 804, that describes visual elements of the plurality of meeting objects during the electronic meeting. The recorded inputs are transcoded into a metadata description of the recorded inputs in step 805. As noted previously, various embodiments of the present invention may transcode each recorded input into a metadata description, while other embodiments transcode only the recorded inputs that deal with non-video and non-audio data. Each one or more of the recorded input metadata and the generated metadata is saved to a separate file, in step 806, which are then associated with the electronic meeting in step 807.

When a user decides to replay a meeting or portions thereof, either of the electronic meeting, one or more of the separate files, or a portion of the one or more of the separate files is replayed, in step 808, responsive to a user selection. In step 809, in response to the replay request, the visual elements of the plurality of meeting objects are re-rendered using the generated metadata. Further in response to the replay request, in step 810, information to be displayed within the plurality of meeting objects is provided using the metadata description.

Additionally, a user may search archives of various electronic meetings or recordings to find replay content. In step 811, a search request is received from a user for specific content of the electronic meeting. One or more of the metadata description and the generated metadata are searched for the specific content in step 812, which are then displayed to the user in step 813. The user would then select one or more of the display results to initiate the replay. Replay would then proceed according to steps 808-810.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method comprising:
creating a main timeline defining an organization of an electronic meeting;
recording each of a plurality of input sources of different media types into a corresponding one of a plurality of separate recording files, the input sources causing display of different media types within an interface, wherein one or more meeting objects present information from each of said plurality of input sources during said electronic meeting;
providing a separately accessible memory address of a computer storage device for each of said plurality of separate recording files; and
generating metadata identifying when a meeting object of said one or more meeting objects was created or deleted during said electronic meeting, said metadata used with the main timeline to allow replay of a selected portion of said electronic meeting with less than all of the one or more meeting objects.

2. The method of claim 1 wherein said metadata further describes visual aspects of said one or more meeting objects.

3. The method of claim 2 further comprising:
storing said generated metadata in another separately accessible memory address associated with said electronic meeting.

4. The method of claim 1 further comprising:
associating said separately accessible memory address with said main timeline, wherein a user may independently replay one or more of:
said electronic meeting; and
one or more of said plurality of separate recording files.

5. The method of claim 1 further comprising:
inserting synchronization data into said main timeline to define said organization.

6. The method of claim 5 further comprising:
replaying one or more selected ones of said plurality of separate recording files according to said synchronization data.

7. The method of claim 1 further comprising:
converting said plurality of separate recording files into a metadata description of said plurality of separate recording files.

8. The method of claim 7 further comprising:
receiving from a user a command to replay selected portions of said electronic meeting;
responsive to said command, assembling a meeting replay using said metadata description of said selected portions of said electronic meeting.

9. The method of claim 7 further comprising:
receiving from a user a search request for specific content of said electronic meeting;
searching said metadata description for said specific content; and
displaying to said user results of said searching.

10. A computer implemented method comprising:
monitoring a plurality of meeting objects displaying content relating to an electronic meeting, at least two of the meeting objects having different media formats;
recording one or more inputs for each of said plurality of meeting objects into a corresponding one of a plurality of separate files;
generating metadata describing visual elements of said plurality of meeting objects during said electronic meeting, the visual elements including the location of the object on a display screen and movement of the object on the display screen, wherein said metadata further identifies when a meeting object of said plurality of meeting objects was created or deleted during said electronic meeting, said metadata used to allow replay of a selected portion of said electronic meeting with less than all of said plurality of meeting objects; and
storing said generated metadata to said corresponding one of a plurality of separate files.

11. The method of claim 10 further comprising:
associating each of said plurality of separate files with said electronic meeting; and
replaying, responsive to a user selection, one or more of:
said electronic meeting;
one or more of said plurality of separate files; and
a portion of said one or more of said plurality of separate files.

12. The method of claim 11 further comprising:
creating a timeline defining an organization of said electronic meeting; and
inserting synchronization data into said timeline.

13. The method of claim 12 wherein said replaying replays according to said synchronization data.

14. The method of claim 11 wherein said replaying comprises:
rendering visual elements of said plurality of meeting objects using said generated metadata to re-create an interface appearance on the display screen; and
providing information to be displayed within said plurality of meeting objects using said recorded inputs.

15. The method of claim 10 further comprising:
converting said recorded inputs into a metadata description of said recorded inputs.

16. The method of claim 15 wherein said replaying comprises:
rendering visual elements of said plurality of meeting objects using said generated metadata; and
providing information to be displayed within said plurality of meeting objects using said metadata description.

17. The method of claim 15 further comprising:
receiving from a user a search request for specific content of said electronic meeting;
searching one or more of said metadata description and said generated metadata for said specific content; and
displaying to said user results of said searching.

18. A computer program product having a computer readable medium with computer program logic recorded thereon, said computer program product comprising:
code for monitoring a plurality of pods displaying information relating to an electronic meeting, at least two of the pods supporting different media types;
code for recording an input source for each of said plurality of pods into a corresponding one of a plurality of separate files;
code for generating metadata describing visual aspects of an overall interface of said plurality of pods during said electronic meeting, wherein said metadata further identifies when a pod of said plurality of pods was created or deleted during said electronic meeting, said metadata used to allow replay of a selected portion of said electronic meeting with less than all of said plurality of pods; and
code for storing said generated metadata to said corresponding one of a plurality of separate files.

19. The computer program product of claim 18 further comprising:
code for associating said plurality of separate files with said electronic meeting; and
code, responsive to a user selection, for replaying one or more of:
said electronic meeting;
one or more of said plurality of separate files; and
a portion of said one or more of said plurality of separate files.

20. The computer program product of claim 19 further comprising:
code for creating a timeline defining an organization of said electronic meeting; and
code for inserting synchronization data into said timeline.

21. The computer program product of claim 20 wherein said code for replaying replays according to said synchronization data.

22. The computer program product of claim 19 wherein said code for replaying comprises:
code for rendering visual aspects of said plurality of pods using said generated metadata; and
code for providing information to be displayed within said plurality of pods using said recorded input source.

23. The computer program product of claim 18 further comprising:
code for converting said recorded input source into a metadata description of said recorded input source.

24. The computer program product of claim 23 wherein said code for replaying comprises:
code for rendering visual aspects of said plurality of pods using said generated metadata; and
code for providing information to be displayed within said plurality of pods using said metadata description.

25. The computer program product of claim 23 further comprising:
code for receiving from a user a search request for specific content of said electronic meeting;
code for searching one or more of said metadata description and said generated metadata for said specific content; and
code for displaying to said user results of said code for searching.

26. A system comprising:
memory coupled to a processor;
a display device coupled to said processor;
an electronic meeting application stored in said memory, wherein, when executed by said processor, creates an electronic meeting, said electronic meeting comprising:
one or more meeting objects arranged in an interface rendered on said display device, wherein said one or more meeting objects support a plurality of different media types; and
an archiver configured to monitor said one or more meeting objects and further configured to record a data source for each of said one or more meeting objects into a corresponding one of one or more separate recording files, wherein said archiver is further configured to generate a metadata description of visual aspects of said one or more meeting objects, said visual aspects including a location, movement, and appearance of a corresponding object of said one or more meeting objects, wherein said metadata description further identifies when a meeting object of the one or more meeting objects was created or deleted during said electronic meeting, said metadata description allows replay of a selected portion of said electronic meeting with less than all of said one or more meeting objects, and wherein said archiver is further configured to store each of said metadata description and said corresponding one of said one or more separate recording files in an independently accessible memory address.

27. The system of claim 26 wherein said archiver is further configured to maintain an order of presentation for each of said one or more meeting objects in a timeline.

28. The system of claim 26 further comprising:
a meeting player stored in said memory, wherein, when executed by said processor, said meeting player re-generates said interface with said one or more meeting objects using said one or more separate recording files and said corresponding metadata description responsive to a replay request received from a user to replay selected information from said electronic meeting, and wherein said meeting player is further configured to populate said re-generated one or more meeting objects with said selected information from said data source related to said electronic meeting.

29. The system of claim 28 wherein said meeting player is further configured to access a run-time library of interface components for said means for re-generating, wherein said one or more separate recording files and said corresponding metadata description are used for said accessing.

30. A computer implemented method comprising:

creating a main timeline defining an organization of an electronic meeting;

recording each of a plurality of input sources of different media types into a corresponding one of a plurality of separate recording files, the input sources causing display of different media types within an interface, wherein one or more meeting objects present information from each of said plurality of input sources during said electronic meeting;

providing a separately accessible memory address of a computer storage device for each of said plurality of separate recording files; and identifying in the main timeline synchronization data for said one or more meeting objects;

generating metadata in metadata files, wherein metadata of each metadata file describes a meeting object of said one or more meeting objects as it appeared in said electronic meeting and comprises an individual timeline identifying when the meeting object was created or deleted during said electronic meeting, wherein said metadata is used with the main timeline to allow replay of a selected portion of said electronic meeting with less than all of the one or more meeting objects, wherein when the meeting object is replayed, the metadata is used to display the meeting object by populating a display canvas of the meeting object with recorded content and the individual timeline and main timeline are used to synchronize display of said one or more meeting objects.

* * * * *